United States Patent [19]

Harrison et al.

[11] 4,447,479
[45] May 8, 1984

[54] PLASTICS SHEET MATERIAL AND ARTICLES PRODUCED THEREFROM

[75] Inventors: Peter Harrison, Wakefield; Thomas N. Gaunt, Leeds, both of England

[73] Assignee: Plastona (John Waddington) Ltd., Leeds, England

[21] Appl. No.: 201,557

[22] Filed: Oct. 28, 1980

Related U.S. Application Data

[63] Continuation of Ser. No. 948,421, Oct. 4, 1978, abandoned, which is a continuation of Ser. No. 842,145, Oct. 14, 1977, abandoned, which is a continuation of Ser. No. 682,863, May 3, 1976, abandoned.

[30] Foreign Application Priority Data

| May 8, 1975 | [GB] | United Kingdom | 19469/75 |
| Jun. 7, 1975 | [GB] | United Kingdom | 24533/75 |
| Jun. 7, 1975 | [GB] | United Kingdom | 24534/75 |
| Sep. 9, 1975 | [GB] | United Kingdom | 36946/75 |
| Nov. 29, 1975 | [GB] | United Kingdom | 49150/75 |

[51] Int. Cl.³ .................. B32B 27/32; B65D 5/00
[52] U.S. Cl. .................................. 428/35; 229/16 R; 264/68; 264/148; 264/153; 273/295; 273/DIG. 12; 428/220; 428/323; 428/328; 428/330; 428/331; 428/338; 428/523; 524/584
[58] Field of Search ............ 229/2.5, 38, 44 R, 2.5 R, 229/16 R; 260/2.5, 23, 42.21, 42.46; 428/220, 323, 325, 331, 338, 454, 492, 500, 538, 35, 328, 330, 523; 264/54, 68, 148, 153, 211; 273/295, DIG. 12; 524/413, 425, 436, 445, 447, 451, 584

[56] References Cited

U.S. PATENT DOCUMENTS

| 3,250,731 | 5/1966 | Buhl et al. | 264/16 |
| 3,874,880 | 4/1975 | Venor et al. | 430/505 |
| 3,876,735 | 4/1975 | Bontinck et al. | 264/22 |
| 3,993,718 | 11/1976 | Bontinck et al. | 264/22 |

FOREIGN PATENT DOCUMENTS 1192132  5/1970  United Kingdom ............. 264/16

*Primary Examiner*—Bruce H. Hess
*Attorney, Agent, or Firm*—Fred Philpitt

[57] ABSTRACT

This invention relates to plastic sheet material, and in particular concerns the production of a plastics sheet material which has a wide range of uses, because of the properties thereof.

26 Claims, 13 Drawing Figures

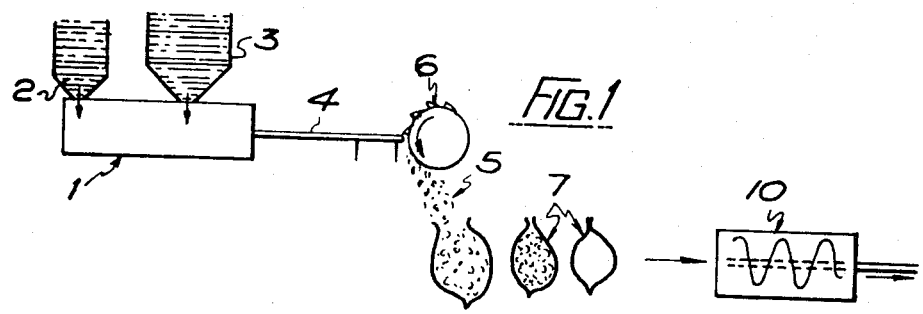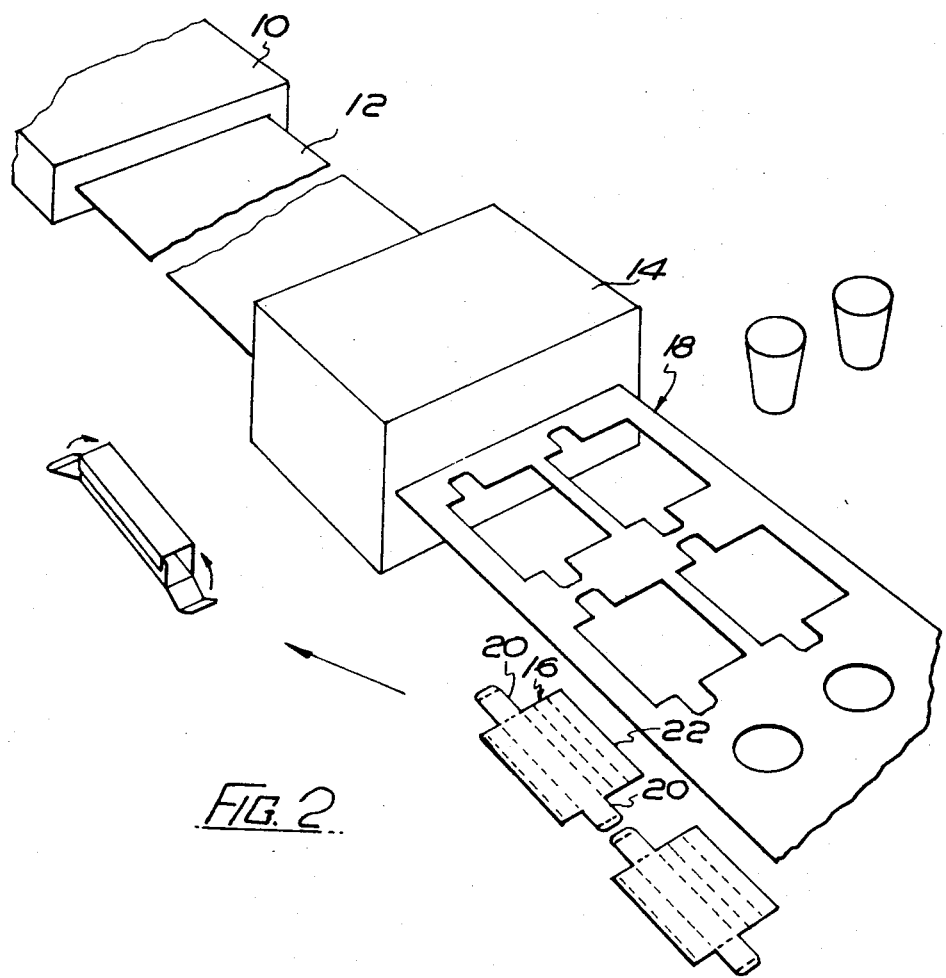

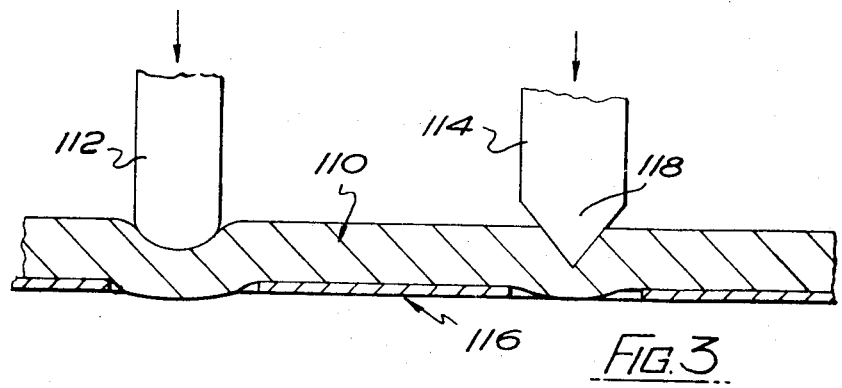
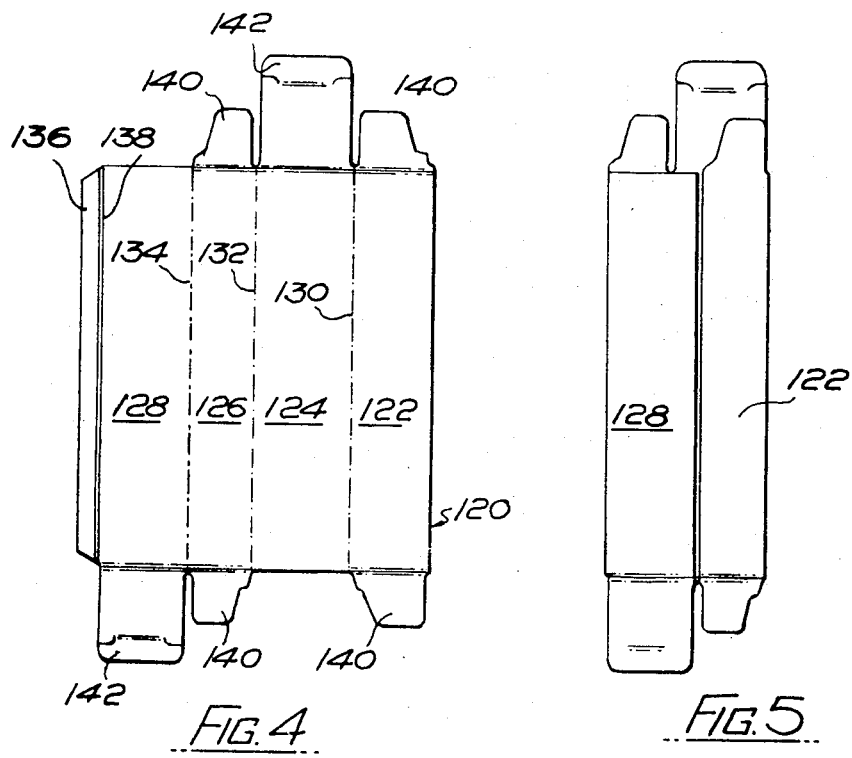
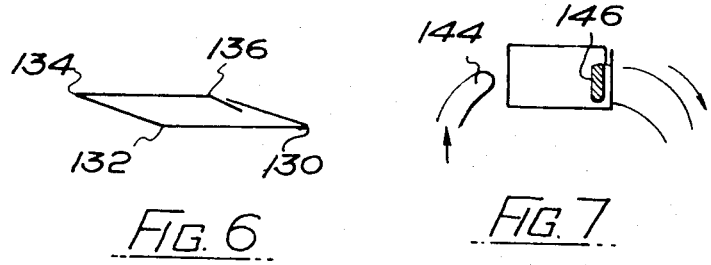

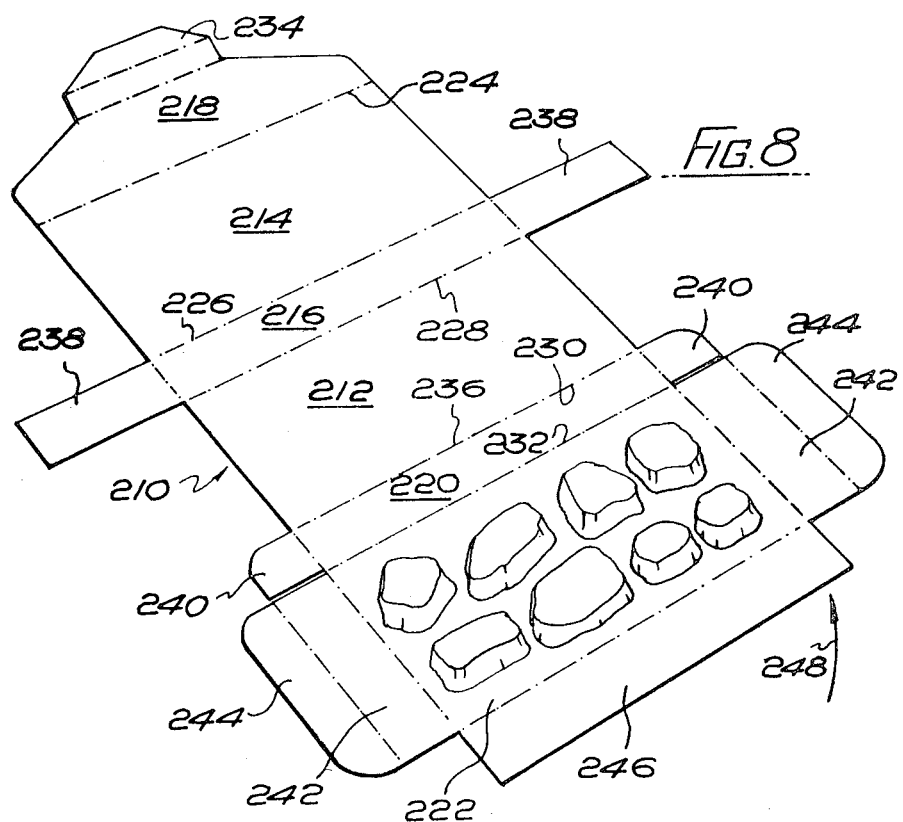
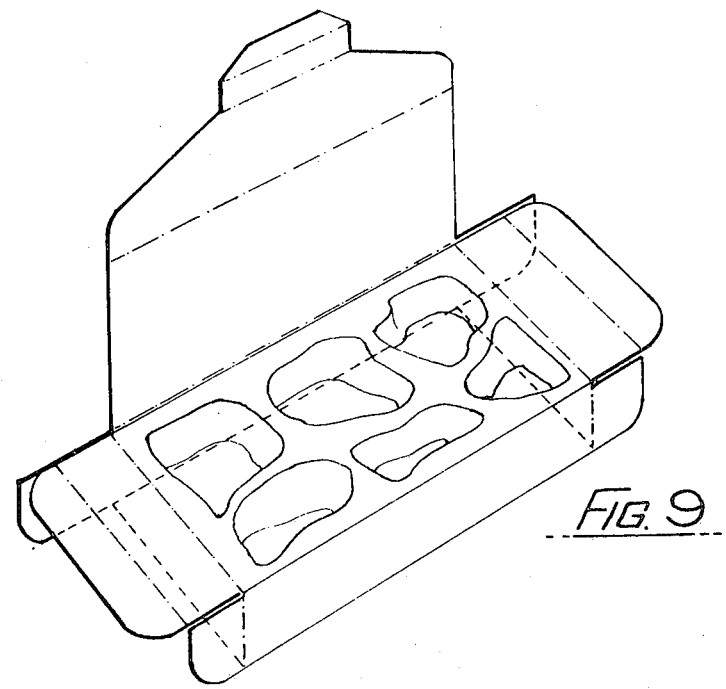

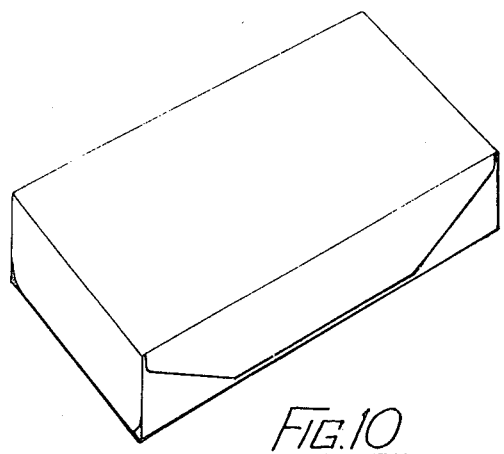
FIG.10
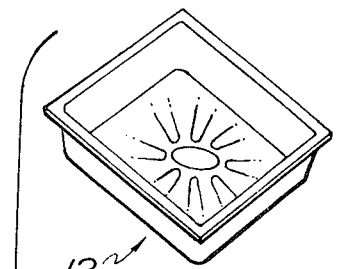
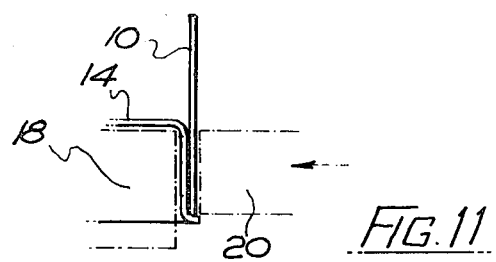
FIG.12
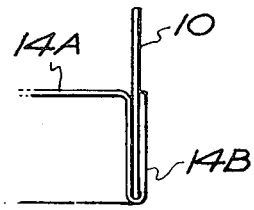
FIG.13
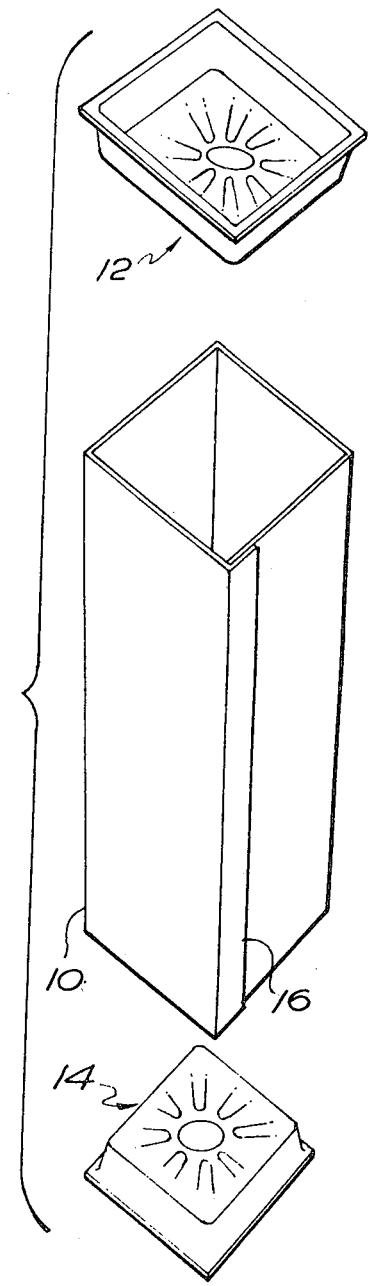

PLASTICS SHEET MATERIAL AND ARTICLES PRODUCED THEREFROM

This is a continuation of application Ser. No. 948,421, filed Oct. 4, 1978 (now abandoned) which is a continuation of application Ser. No. 842,145, filed Oct. 14, 1977 (now abandoned) which is a continuation of application Ser. No. 682,863, filed May 3, 1976 (now abandoned). As is well known, plastics sheeting is now in extensive use in many industries, but heretofore there has not been provided a plastics sheet material which has general application in a large number of fields. Generally speaking, particular plastics materials are designed for particular uses, and materials which are designed for a particular use, usually have limited other uses.

The material which is provided by this invention will have, we feel, a very wide range of uses. For example, we have found that it is extremely suitable as a substitute for carboard, and paper in general, and yet it can also be used to form thin walled containers such as drinking cups or foodstuffs tubs and lids therefor.

In endeavouring to provide a plastics sheet material which has a wide range of uses, we have concerned ourselves with introducing additives to achieve a suitable material which can be formed into sheet for example by extruding and/or calendering and we believe that by the present invention we have provided a material of a unique and novel composition which forms into sheet form satisfactorily, and the resulting sheet has a wide range of applications.

In accordance with the present invention there is provided a sheet material manufactured by compounding 5–10 parts by weight of inorganic particulate material with 95 to 30 parts by weight of polyolefin resin selected from polypropylene; polypropylene-ethylene sequential copolymer (as herein defined) polypropylene-ethylene random copolymer; high density polyethylene; or any mixture of these, the compounding being carried out essentially by mechanical working to generate heat and to disperse the inorganic material evenly throughout the resin so as to produce a molten mass of uniform consistency having a melt flow index of between 0.55 and 2.2 cc/10 minutes at 230° C. under a load of 2.16kg and subsequently converting the mass into the sheet in a thickness of 0.1–1.2 mm by extrusion and/or calendering.

The mechanical working of the inorganic material and the resin is an important part of the present invention as it is necessary that the inorganic material should be very evenly dispersed throughout the resin as otherwise it will not form into satisfactory sheets. The head to produce the molten mass comes essentially from tis working although where the working is effected by means for example of a screw working in a barrel, the barrel may be encased in electric heating bands which may supply some heat to the mixture, but essentially are provided to prevent heat generated by the mechanical working from escaping from the barrel.

Conventional compounding apparatus may be used, such as contra-rotating and intermeshing screws for compounding the resin and inorganic material to produce the sheet.

The resin may include small amounts of compatible elastomer.

According to a preferred arrangement of the invention, the resin is (a) a sequential copolymer(as herein defined) of propylene with from 10 to 34% by weight (based on the weight of the copolymer) of ethylene and/or (b) a blend of polypropylene having sufficient of a rubber to confer on the blend an impact resistance and flexibility which are within the range of impact resistances and flexibilities as are possessed by the range of sequential copolymers defined in (a).

We have discovered that folded containers, other folded articles and blanks according to this preferred feature of the invention possess most of the desirable properties of high quality carboard and that an average shopper would find great difficulty in realising the containers are not made from carboard. Further, the sheet material from which the containers are made is inherently waterproof and so does not need a waterproofing treatment. The sheet material will also lie flat in the container and blank making machinery. These characteristics are obtained without the need specifically to subject the sheet material to an orientation treatment prior to creasing and folding.

The sheet material of this invention preferably has a thickness of at least 0.3 mm if the folded containers are to have properties comparable to those of high quality carboard and it is preferred to use sheet material having a thickness of at least 0.4 mm which scores and cuts neatly enough to enable it to compete with high quality carboard in high speed packaging machinery.

This sheet material can also be thermoformed satisfactorily into a whole host of small domestic tubs, and cups and lids therefor.

The sheet material is preferably extruded from a composition comprising a sequential copolymer of propylene and ethylene and/or a blend of polypropylene and rubber as stated herein. By "sequential copolymer", we mean a particular type of copolymer which is made by first polymorising propylene and then prior to the completion of the polymerisation reaction, ethylene is injected into the polymerisation zone so that as the polymerisation proceeds, polymer chains are produced which become increasingly rich in copolymerised ethylene randomly distributed among polymerised propylene. These sequential copolymers in sheet form are softer and more flexible than polypropylene yet when mixed with particulate inorganic material and used for sheets, the sheets develop an impact resistance and a rigidity which are adequate in comparison with high quality cardboard, and at the same time the sheets are capable of enough orientation to permit neat creasing and folding and also thermoforming. Moreover, these properties are obtained with sequential copolymers which are high melt flow index materials and are not therefore ultra-high molecular weight materials.

Polypropylene (i.e. propylene homopolymer) can be used to make sheets having impact resistance and flexibility similar to sheets made from the sequential copolymers described above, by blending with a rubber. Examples of rubbers which may be used as polyisobutylene butyl rubbers and ethylene-propylene elastomers such as those described on pages 255 to 258 of "Chemistry and Industry" of Mar. 16, 1974. The precise quantities of rubber needed to confer the required impact resistance and flexibility on the polypropylene sheets will vary from rubber to rubber and can be determined by routine impact and flexibility tests.

There should preferably be 20 to 70% by weight of the solid particulate inorganic material and such inorganic material desireably has a hardness of less than 5.5 on the Mohs' scale. Examples of suitable inorganic materials may include talc, calcium carbonate, dolomite, kaolin or gypsum or any combination of these. Use of an inorganic material which gives the sheet a soft feel is desirable to facilitate creasing and hinging both of which appear to cause a compression in the sheet material. Such inorganic material also appears to have a desirable effect on the feel of the sheet material. The introduction of soaps and oils into the composition from which the sheet material is formed may well improve the production of the material. The preferred inorganic material is talc or calcium carbonate; good results have been obtained using both the chinese talc known as Haichen talc and calcium carbonate.

The particles of the inorganic material preferably should be capable of passing through ASTM Sieve 140 and preferably 97% by weight of the particles should be capable of passing through ASTM Sieve 325. The preferred materials should preferably comprise at least 30% by weight of particles having a largest dimension of between 10 and 18 microns in order to promote good creasing and hinging.

The composition from which the sheet material is formed may also comprise from 1 to 8% by weight of a pigment having a hardness of less than 6.8 on Moh's scale.

The presence of the pigment achieves a uniform background on which to print. The preferred pigment is titanium dioxide. Anatase titanium dioxide has a hardness of 5.5 to 6 on Moh's scale and has been used to good effect. However, rutile titanium dioxide which, has a hardness of 6 to 6.5 causes less long term degradation of the sheet material and may be preferable if the sheet material is to be used in making hinged containers or other articles which are expected to have a long life. Both the rutile and anatase titanium dioxide pigments should preferably be coated with up to 5% by weight of alumina and up to 2% by weight of silica. The pigment may be used in combination with up to ½ by weight of an optical brightener such as ultramarine. The composition from which the sheet material is formed, preferably by extrusion but also by calendering may optionally contain processing aids such as soaps including calcium stearate. The compositions may also contain conventional additives such as stabilisers The surface of the sheet materials used in the performance of this invention have a good ability to receive printing inks. However, this ability can be further enhanced by subjecting the surface to one of the oxidation treatments of the type described in the book "Polythene" edited by Renfrew and Morgan and published by Iliffe, see pages 542 and 543 of the 2nd edition.

The most convenient of these treatments is the one which uses a corona discharge.

The composition preferably includes one or more anit-oxidants and it is suggested that conventional amount of hindered phenol thio-ester be used.

A particular embodiment of the invention is illustrated by the following examples:

A sequential propylene-ethylene copolymer comprising 15% by weight of copolymerised ethylene was made by polymerising propylene and then injecting 15% by weight of ethylene into the polymerisation zone before all of the propylene had polymerised. Conditions were chosen so as to produce a copolymer which had a melt flow index of 1.1cc/10 minutes.

A thermoformable composition was produced by mechanically mixing together in a compounding machine, 55.9% by weight of the sequential copolymer, 40% by weight of a particulate talc, 4% by weight of a titanium dioxide and 0.1% by weight of calcium stearate so as to cause thorough dispersion of the inorganic material throughout the resin and to heat the mixture into a molten mass of even consistency. The talc was a Haichen talc and 98% by weight of the particles of the talc were capable of passing through ASTM Sieve 325 and 33% by weight of the particles had a maximum dimension within the range 10 to 18 microns. The titanium dioxide was an ahatase titanium dioxide comprising 1.5% by weight (based on the $TiO_2$) of alumina and 0.7 by weight of silica in the form of a surface coating on the particles of titanium dioxide.

The composition obtained from the compounding machine was extruded into a sheet material having a thickness of 0.8 mm. It was found that the sheet material was capable of lying flat and was useable in the form of cut and creased blanks in high speed machinery used to make folded cardboard containers from blanks. Another feature of the mateial was that it could be cut and creased on conventional cutting and creasing machinery without the use of a make ready, thereby facilitating the setting up of the machinery, and reducing the cost of processing the material. The sheet material compared well with high quality cardboard in folding, creasing, scoring, perforating and cutting operations and could be folded to form a container having a crush resistance similar to that of a high quality cardboard container. The sheet material also had good dead-fold properties and could beeasily glued. The folded containers made from the sheet material had a pleasant feel and were very receptive to printing ink with the result htat to a casual observer they were almost indistinguisable from folded containers made from high quality cardboard. Moreover, the material thermoformed extremely well into domestic tubs and cups and lids therefore, such as are used for the storage of food products such as margarine, butter, jam and so on. Furthermore, it has been found that the material of the invention satisfactorily receives markings by ball-point pens, solvent based markers, pencils, typewriting and printing, the inorganic material giving the sheet material a certain amount of surface absorbency. In order to enhance the receptiveness of the material to such markings, it may be subjected to flame treatment or corona discharge treatment.

It is believed that as an alternative to talcom and/or chalk in powdered form any one or a mixture of the following may be used:- clay; calcium carbonate; stearate (coated if desired) kaolin; calcium silicate; asbestine; barytes; gypsum; mica.

In the manufacture of the sheet of the invention, this may be done in a continuous process starting from the raw materials namely the resin and inorganic particulate material, the one or more anti-oxidents and any other additives required for the purposes of the end use of the sheeting, and compounding the raw mateials, and then leading the molten mass directly whilst soft to an extrusion die or calendering rollers where it is formed into sheet. The extrusion die may be attached directly to the compounding apparatus so that a single apparatus performs the two functions namely compounding and extrusion into sheet.

The process may however be in two stages, which are quite separate. Thus, the aforesaid raw materials could be compoundedfirst and the molten mass converted to ground particle form by being extruded in the form of strings of material which are subsequently reduced to solid particle form by and/or chopping. The raw materials may therefore be compounded by one manufacturer and supplied to another manufacturer for extrusion or calendering into the sheet of the invention. The procedure of British Standard 2782: Part 1/105C/1970 on Davenport standard melt flow index equipment, which normally measures in weight the material which flows out of an orifice time period at certain conditions of temperature and weight applied, but because the introduction of the inorganic material into the resin so greatly effects the specific gravity of the mass as compared to heat resin, it is better for this invention to procure results by determining the volume of material per time period. Furthermore, the volume which flows through the orifice is a direct indication of the viscosity of the mass, and it has been found that only materials of viscosity in the range indicated by the melt flow index of 0.55cc - to 2.2cc/10 minutes at 230° C. satisfactorily into sheet material having a wide range of uses.

Owing to the special selection of the melt flow index in accordance with the present invention the material has excellent flexing and handling characteristics, and furthermore it is possible using conventional cutting and creasing machinery, to produce carton blanks which are extremely satisfactory as explained above, the material creasing along the crease lines in a manner almost identical to conventional cardboard.

The sheet material readily receives embossing, and retains such embossing in permanent set.

The sheet material according to the invention which is cut and creased to form carton blanks can be erected into cartons by conventional equipment, and the blanks can be provided with locks as a conventinal cardboard blanks, or hot melt adhesive can be used to hold the cartons in erected condition. Conventional board or paper glueing equipment can be used for the application of hot nolt adhesives.

The material therefore can be used effectively in all cases where carton blanks have been provided, without any, or at least, any substantial, modification of the existing cardboard erecting and glueing equipment.

Another suitable application for the sheet material is for the production of playing cards, and for the production of such articles it is desirable to ensure that the capacity of the material is made as high as possible.

The material satisfactorily receives varnishing using normal varnishing techniques such as are used for the fixing of printing inks on sheet material or for the fixing of other impressions on such material.

The sheet material can be thermoformed satisfactorily and can be used for the production of thin walled containers and lids therefor which are produced by a thermoforming or equivalent process. In such process the sheet material will require to be heated. This may be effected conventionally. The material is sufficiently stable, and the use thereof results in a high quality product of good stability.

The sheet material is unaffected by most water and solvent based liquids and the material further-more presents a reasonably high barrier to moisture vapour. This makes the material extremely good for containers which have to hold hygroscopic or water containing products.

If desired, the material may be laminated with another material or coated to vary the surface finish thereof.

It is to be appreciated that the amount of filler in the plastics material may be varied as desired within the range specified and the material may also include as explained herein and in varying degrees, other additives which may be desirable for the particular end use of the material.

The sheet material of thickness at the higher end of the range can be used to produce jackets for binders, and other more rigid articles, especially articles in which it is desirable to provide a hinge. The examples given in this specification are in no way intended to limit the use of the material.

It has been found that the material according to the invention extrudes in an extremely satisfactory manner and is of high quality. Furthermore, where the material is used for producing articles which are cut from the material, leaving a skeletal waste, this waste can be re-used and can be returned, suitably comminuted, to the extrusion press.

In a particular interesting modification of the invention blowing agents as well as inorganic particulate material are incorporated into the sheet material. The blowing agents are incorporated in most cases, as minor amount of a solid chemical substance capable of decomposing into gases at a temperature somewhat less than the temperature of sheet formation. These chemical substances are known as foaming or blowing agents and a typical substance is p-toluene sulfonyl semicarbazide. The effect of the blowing agent is to cause the specific gravity of the resultant extruded sheet to be considerably decreased. In a typical example, a granular compound consisting of 60 parts of polypropylene homopolymer having a melt flow index of 0.55 cc and 40 parts of finely dispersed talc known as Garotalc 132, prepared by dispersing the finely divided talc into polypropylene on a Buss Ko Kneader, extruding the material into ribbon and granulating this ribbon, was mixed with 0.4% by weight of p-toluene sulfonyl semicarbazide. The resultant intimate mixture was extruded on a 6" single screw extruder having a length to diameter ratio on the screw of 32:1 and sheet material produced by cooling the sheet material by contact with rollers provided from the flat die fixed to the extruder.

During the extrusion process the temperature of the melt within the barrel of the extruder was progressively increased to a temperature of 220° C. and the temperature of the die was maintained at a temperature of 205° C. The resultant sheet with a smooth finish and a specific gravity of 0.85 of adequate strength capable of being cut and creased by methods described in this specification and thermoformed by suitable thermoforming techniques. The specific gravity of a comparable material produced without the use of a blowing agent was 1.25 so that by the use of the blowing agents a considerable increased yield of material is obtained. Reference will now be made to the accompanying diagrammatic drawings, wherein:

FIG. 1 shows how compounded material is produced;

FIG. 2 shows how container blanks are produced from the sheet material of the invention;

FIG. 3 is an enlarged sectional elevation illustrating the basic difference between the formation of creases using a creasing rule and a half cut knife;

FIG. 4 is a plan of a blank of sheet material according to the invention which is erectable into a packaging container FIG. 5 is a plan of the blank of FIG. 2, after it has been folded to flattened skillet form;

FIG. 6 is an end view of the skillet of FIG. 5;

FIG. 7 is an end view similar to FIG. 6, but shows how the skillet is erected to tubular form;

FIG. 8 is a perspective view of another blank of sheet material according to the invention;

FIG. 9 is a perspective view illustrating the sequence of the erection operation of the blank of FIG. 8;

FIG. 10 is a perspective view illustrating the erected container resulting from erecting the blank of FIG. 8;

FIG. 11 is an exploded perspective view of a container of sheet material according to the invention;

FIG. 12 is a sectional elevation showing how the end plugs and blank of the container of FIG. 11 are fused together; and FIG. 13 is a sectional elevation similar to FIG. 12 but showing a modified form of end plug. Referring to FIG. 1 a compounding machine of conventional form is indicated by reference numeral 1, and it will seen that this is associated with feed hoppers 2 and 3. The resin, namely the sequential copolymer resin is introduced into the compounding machine at hopper 2, whilst the inorganic particulate material is introduced at hopper 3. In the compounding machine, the materials, including any additives such as antioxidants, colouring matter and oils are mechanically worked into a molten mass of melt flow index in the range as herein specified, and the molten mass is extruded in the form of a plurality of strings of which one is indicated by numeral 4. These extruded strings are cooled or allowed to cool, and then are reduced to particle form 5 by means of a grinding apparatus 6. At this stage, the compounded particles may be bagged as shown by reference numeral 7, and the compounded particles can subsequently be heated once more into a molten mass in an extruding machine 10 and extruded in sheet form 12.

Referring now to FIG. 2 the extruding machine is indicated diagrammatically again by reference numeral 10, and the sheet material being extruded therefrom by reference numeral 12. A break is shown in the sheet material 12 between the extruding machine 10, and a conventional cutting and creasing machine 14 in order to indicate that the sheet material may well be stored for example in reel form before being passed to the cutting and creasing machine 14. Indeed, the extruding may be done in one location or factory, and the cutting and creasing done in another location or factory. It is on the other hand possible to pass the sheet material 12 directly from the extruder to the cutting and creasing machine 14, assuming that the material has cooled and set sufficiently to enable cutting and creasing to be carried out thereon. Furthermore, it may be more usual to cut the material 12 into large sheets which are individually cut and creased as is done conventionally with high quality cardboard.

In any event, the material 12 is shown emerging from the machine 14 as having been cut and creased to define container blanks 16, the skeletal waste of the sheet material being indicated by numeral 18. This skeletal waste can be re-processed by being ground to particle form and returned to the extruder in order to maximise use of the material.

In the example shown, each blank comprises a number of rectangular panels connected together by crease lines formed in the machinery 14, and one of the panels is provided with end closure panels 20, another of the panels being provided with a glue tab 22. The container which can be erected from each of the blanks 16 is also shown in the figure, and the erection is by a conventional process by glueing the tab 22 to the outside of the extreme panel as the other side of the blank. To close the container, the end panels 20 are simply folded over as indicated by the arrows in the Figure and tuck in tabs of these end panels serve to hold the end panels in closed position.

It will be appreciated that the machinery 14 can be adapted to produce more complicated blanks, or even simpler blanks such as might provide book jackets or wallets which do not require any glueing, or the blanks may simply define inserts for insertion in other packaging containers.

Several more specific plant installations will now be described.

1. Polypropylene powder complete with stabilisers etc., and filler, for example the chalk or talc referred to herein are taken from bulk storage silos and automatically fed to a high speed mixer.

The thoroughly mixed ingredients are then fed directly into a twin contra rotating screw extruder where the molten polymer and filler are subject to high shear action, and the resulting homogeneous compound forced through a standard flat sheet die to produce the sheet material.

The extrudate is then passed through a conventional sheet line consisting of a polishing roll stack, surface treatment unit, such as a Corona discharge unit, antistatic bath, haul off and slitter, terminating in a winding unit for reels or a guillotine and stacking unit for flat sheets.

2. One alternative is to take the polypropylene powder with stabilisers etc., and feed this with the chalk or talc filler directly into a compounding unit, such as a Buss Ko Kneader. The Buss Ko Kneader would then be fitted with a conventional cross head extruder, this cross head extruder being fitted with a standard sheet die and conventional sheet line equipment as described in (1).

3. A further alternative would be to replace the standard sheet die in (1) and (2) with a multi-hole die face cutting unit to produce pellets or granules as described in relation to FIG. 1. These granules could then be processed through a conventional single screw extruder and sheet line.

4. A further alternative would be to replace the standard sheet die in (1) and (2) by a strand die, water bath, granulator and drying unit to produce pellets or granules.

The maximum temperature in the compounding and extrusion systems is in the order of 250° C.

A Buss Ko Kneader type P.R 200 is capable of producing up to 1,000 kgs per hour of 40% filled polypropylene in either sheet or pellet form.

An 80 m.m. dia. twin screw extruder is capable of producing up to 250 kgs per hour of 40% filled polypropylene in either sheet or pellet form.

In the field of cut and creased packaging containers, the material lends itself to the production of unusual and novel container constructions several of which have been illustrated in FIGS. 3 to 13 and will now be described.

Referring to FIGS. 3 to 7, in FIG. 3 there is shown, to an enlarged scale, a sectional view of the sheet material 110 according to the invention which is being simultaneously creased by means of a creasing rule 112 of conventional construction, and a cutting knife or rule 114. The creasing rule 112 has a rounded edge which engages the sheet 110, and therefore tends to compress the sheet against the forme 116, whilst the rule 114, having a sharp cutting edge 118 which engages the sheet, slices into the sheet and cuts same as opposed to the creasing action of the rule 112. The rule 112 forms a conventional crease, whilst the rule 114 forms what is known in the art as a "half-cut". It is not necessary that the half-cut should penetrate half the depth of the sheet 110.

The plastics sheet material 110 is formed with creases and at least one half-cut crease cline in order to give the resulting skillet container certain desired characteristics, as will be explained. It is to be noted that where a half-cut is provided in the sheet material, the requirement is to improve the dead fold characteristics of the sheet, and therefore it is to be pointed out that some other crease forming arrangements, as opposed to conventional creasing, can be used to improve the dead fold characteristics of plastics sheeting. Where the expression half-cut is used herein it is intended that such equivalent crease formations be covered.

Referring now to FIG. 4, in this Figure there is shown a simple blank 120 which is erectable by container erecting machinery into a skillet container. The blank is of plastics sheet material as set forth herein and in the Figure the crease lines are indicated by chain dotted lines whilst the half-cuts are indicated by double parallel lines. The blank comprises four panels, 122, 124, 128 which are hingedly interconnected along conventional crease lines 130, 132 and 134, the panels 122 and 126 being identical, and the panels 124 and 128 being identical, but larger than the other two. All the panels are rectangular in cross section, as shown in FIG. 7, to the free edge of panel 128 is hinged a glue tab 136, the tab 136 being hinged to panel 128 by half-cut crease line 138.

The ends of the panels 122 to 128 are provided with conventional tuck-in flaps and end closures 140 and 142, as will be well understood by those skilled in the art. It is to be mentioned, however, that flaps and panels 140 and 142 are hingedly connected to the panels 122 to 128 by means of half-cuts, in order to improve the dead fold characteristics of these flaps and panels relative to the main panels 122 to 128, to which they are connected.

Erection of the blank is by conventional erecting machinery, and in the first stage of operation the blank is folded about the crease line 134, so that panel 128 overlies panel 126 and partially overlies panel 124. In the next operation, the panel 122 is folded over panel 124, so as to overlie at its free edge region, the glue strip 136, glue having been previously provided on either panel 122 or strip 136 or both so that the blank takes up the skillet form illustrated in FIG. 3.

Because the skillet has the three conventional creases 130, 132 and 134, it does not lie completely flat when not otherwise constrained, but rather takes up the position as shown in FIG. 6, and the creases 134 and 130 recover from the 180° bending slightly and this combined with the natural bowing effect at crease 132, causes the skillet to be slightly open as shown. This slight opening of the skillet in the flattened condition, facilitates the erection of same to the position shown in FIG. 7. In FIG. 7 there are shown two erecting members 144 and 146, the erecting member 146 having been inserted into the tubular skillet whilst in the condition shown in FIG. 6. To erect the skillet container from the position shown in FIG. 6 to that shown in FIG. 7, the members 144 and 146 are moved as indicated by the arrows in FIG. 7. With this operation the container folds along half-cut crease line 136 which has good dead fold characteristics and the sharp corner thereat is maintained as shown in the FIG. 7 position when the constraint of the members 146 and 144 is removed. Indeed, because this corner remains sharp this has the effect of maintaining the entire container in the erected position. If crease 136 were a conventional crease, however, the container would tend to return towards the FIG. 6 position, which would be undesirable from the point of view of automatic loading of the container. In a modified arrangement, each of crease lines 136 and 132 is defined by a half-cut.

It is appreciated that other forms of skillet container embodying this aspect of the invention can be produced and that the example given shows a particularly simple form of skillet container.

Referring now to FIGS. 8, 9 and 10 and firstly to FIG. 8, the blank 210 as illustrated is erectable into the container illustrated in FIG. 10. The blank is of synthetic plastics sheet material as herein set forth and is suitable not only for cutting and creasing by conventional methods, but also is capable of being thermoformed by heating and moulding techniques which are also conventionally known. The blank comprises a base panel 212, a top panel 214, a rear panel 215, an outer front panel 218, an inner front panel 220, and a thermoformed insert panel 222, these panels being hingeably interconnected along fold lines 224, 226, 228, 230 and 232. The outer front panel 218 is provided with locking extension tab 234, whilst crease line 230 has a central slit 236 for receiving the tab 234 as will be explained. Rear panel 216 is provided with extension flaps, 238 whilst inner front panel 220 is provided with shorter extension flaps 240. The moulded insert panel 222 has extension flaps 242 to which are hingeably connected tuck in flaps 244. The lines of creasing in the blank of FIG. 8 are indicated in chain dotted lines, whilst the cut lines are indicated as is normal by full lines. The moulded insert panel 222 finally is provided with a further extension flap 246 which forms an inner rear panel in the erected container as will be evident hereinafter.

The blank 210, apart from the thermoforming of the panel 222 is cut and creased using conventional techniques, and the panel 222 is moulded using conventional techniques. The cutting and and moulding operations may be performed sequentionally or simultaneously although in the latter case either the cutting and creasing machine would have to be modified simultaneously to perform thermoforming, or the thermoforming machine would have to be adapted to perform a cutting and creasing operation.

The creases formed in the blank may be any conventional means such as creasing rules, or by means providing half-cuts or skip cuts.

In erecting the blank shown in FIG. 8 to the container shown in FIG. 10 the blank is first of all folded about crease line 236 in a manner indicated by arrow 246 in FIG. 8. In addition, the panel 222 is folded inwardly about crease line 232 until it reaches the position shown in FIG. 9. The panels 214, 216 and 218, are folded into a vertical plane about crease line 228, and this sequence of operations results in the blank reaching the condition shown in FIG. 9.

To complete the container, the flaps 238 and 240 at the container ends as shown in FIG. 9 are tucked inwardly, and the ends are closed by flaps 242, the tuck in flaps 244 being tucked under the folded in flaps 238 and 240. The container finally is closed by folding panels 218 and 214 about crease line 226, and by inserting extension lock tab 234 into the locking slit 236. This erection can be done either by hand or by machinery, but in either case the results a packaging container having a moulded insert which forms an integral part of the original blank, which is a significant departure from known packaging containers, as such known containers are normally provided with separate insert, and is achieved by the production of sheet material according to the invention.

It is to be appreciated that the articles to be held by the moulded compartments in the panel 222 would be inserted into such compartments before the final closing of the container.

It would be appreciated that this aspect of the invention has wide application, as dictated by the product to be held by the container. For example, the moulded portions could be designed to hold a specific article such as an Easter Egg or a decorative bottle in a specific rotation in relation to the package outer dimensions, so that the article not only would be held positively by the moulding portions, but also would be cisible through openings in the container walls.

In other embodiments, where it is necessary to form fixed seams i.e. equivalent to the glue seams in cartonboard containers, the plastics material may be heat welded or sealed. Of course, there is no reason why such seams could not be provided by sticking portions of the blank together, but the basic use of a plastics material of the invention gives the extra possibility of heat sealing and welding.

Referring now to FIGS. 11 to 13, in FIG. 11 a packaging container is shown to comprise a body portion 310 and two end plugs 312 and 314. The plugs 312 and 314 are identical in construction. The body 310 is a cut and creased blank of plastics material according to the invention. The body is generally of square section, and has a seam 316 running lengthwise of the body, this seam being formed by an overlapping flap formed in the cutting and creasing of the blank. The body 310 prior to connection of the caps 310 and 312 thereto is capable of being collapsed to flattened condition for transportation.

Each of the end caps 310 and 312 is formed of the same material as the body 310 but is moulded, in this case thermoformed.

In using the container illustrated in FIG. 11, the end plugs 310 and 312 and the body 310 can be transported as separate items. The person who will fill the container for example with liquid medium, will erect the body 310 to the condition shown in FIG. 11, will insert one of the plugs 310 and 312 in the appropriate end of the body 310, will fill the body, and then will insert the other plug 312 and 314 in the other end of the body the plugs being liquid tight sealed in position in order to seal the container completely.

The container may be provided with an easy opening device either in body 310 or in one or both of the end plugs 312 and 314.

In attaching each plug 312 or 314 to the body 310, the surfaces of the plug and body which are brought together may initially be softened by jets of hot air, and then the softened contacted surfaces are pressed together in order to fuse together the plastics material of the can and body.

FIG. 12 illustrates how the cap 314 is fitted into the body 310, and also illustrates a pair of pressure dies 318 and 320 which serve for the pressing together of the flange region of the plug 314 and the overlapping wall portions of the body 310.

FIG. 13 shows a modified form of end cap 314 which is provided with an additional and outwardly located flange portion 314B which lies outside the wall portions of the body 310 when the plug is fitted to the body as indicated in FIG. 13. In this arrangement, the inner surface of the additional flange 314B and the outer surface of the wall portions 310 which overlap this flange 14b are softened prior to pressing same together as indicated in FIG. 12 using dies 316 and 320.

Instead of heat fusing the surfaces of plug and body together, it may be possible to fuse them together using heat sealing or welding or ultrasonic or high frequency welding.

The embodiment of the invention illustrated is sutable, for example for holding liquid contents. It has the advantage that it takes up relatively little space during transportation and the plastics material will not suffer from the raw edge "wicking" effect which happens in equivalent cardboard containers.

It will be appreciated that this aspect of the invention can be applied to containers of different construction from that illustrated, the embodiment illustrated being an extremely simple example. In another embodiment, only one plug 312 or 314 may be used, and the other end of the body can be sealed closed by forming fillet creases and by heat sealing the portions of the wall of the body which are brought together by folding the body about said fillet creases.

This invention also provides a method for making folded containers, other articles or blanks therefore, according to this invention using machinery conventionally used in the manufacture of folded cardboard containers other articles or blanks therefor, with or without a make ready.

It is also possible, as shown in FIG. 2 to produce thermoformed container, such as tubs and cups as indicated at 24 in the drawing far from the sheet 12. Conventonal thermoforming methods may be used.

We claim:

1. A cardboard-like material free of styrene resins and elastomers that retains its dead-fold characteristics manufactured by compounding 5–70 parts by weight of inorganic particulate material with 95 to 30 parts by weight of polyolefin resin selected from polypropylene-ethylene sequential copolymer; polypropylene-ethylene random copolymer; or any mixture of these, the compounding being carried out essentially by mechanical working to generate heat, and to disperse the inorganic material evenly throughout the resin so as to produce a molten mass of uniform consistency having a melt flow index of between 0.55 and 2.2 cc/10 minutes at 230° C. under a load of 2.16 Kg and subsequently converting the mass into the sheet in a thickness of 0.1–1.2 mm by extrusion or calendering.

2. Sheet material according to claim 1 wherein the resin is a sequential copolymer of polypropylene with from 10 to 35% by weight of ethylene.

3. Sheet material according to claim 1, wherein the solid particulate inorganic material has a hardness of less than 5.5 on the Moh's scale.

4. Sheet material according to claim 3, wherein the solid particulate inorganic material is capable of passing through sieve 140 as defined in ASTM Designation E11-61.

5. Sheet material according to claims 3 or 4, wherein at least 30% by weight of the particles of inorganic material have a largest dimensions of between 10 and 18 microns.

6. Sheet material according to claim 1, wherein the inorganic material is free from fibrous components.

7. Sheet material according to claim 1, wherein the sheet material includes a soap to reduce the co-efficient of friction of the particles of inorganic material one relative to another.

8. Sheet material according to claim 7, wherein the soap includes calcium stearate.

9. Sheet material according to claim 1, wherein the inorganic particulate material includes one or more of the following: talc; calcium carbonate; dolomite; kaolin; and gypsum.

10. Sheet material according to claim 1, wherein the sheet material includes from 1 to 3% by weight of a pigment having a hardness of less than 6.8 on Moh's scale.

11. Sheet material according to claim 10, wherein the pigment is titanium dioxide.

12. Sheet material according to claim 11, wherein the titanium dioxide is anatose titanium dioxide.

13. Sheet material according to claim 11, wherein the titanium dioxide is rutile titanium dioxide.

14. Sheet material according to claim 11, 12 or 13 wherein the titanium dioxide is coated with up to 5% by weight of alumina and up to 2% by weight of silica.

15. Sheet material according to claim 1 wherein the pigment is used in combination with up to $\frac{1}{2}$% by weight of optical brightener.

16. Sheet material according to claim 1 wherein the surface of the sheet material is subjected to on oxidation treatment.

17. Sheet material according to claim 1, wherein surface of the sheet material is subjected to a corona discharge.

18. Sheet material according to claim 1, wherein the composition includes the anti-oxidant phenol thioester.

19. Sheet material according to claim 1, including a minor amount of a blowing agent.

20. Sheet material according to claim 19, wherein the blowing agent is introduced in solid form into the compounding operation in producing the molten mass.

21. Sheet material according to claim 19 or 20, wherein the blowing agent is introduced in an amount equal to 0.4% by weight of the molten mass.

22. Sheet material according to claim 21, wherein the blowing agent is P-toluene sulfonyl semicarbazide.

23. Sheet material according to claim 1, wherein the sheet material is extruded.

24. Sheet material according to claim 1, when cut and printed to define playing cards.

25. Sheet material according to claim 1, when thermoformed into articles.

26. Sheet material according to claim 1 when cut and creased to form packaging container or other article blanks.

* * * * *